United States Patent [19]

Elvin

[11] Patent Number: 4,828,684

[45] Date of Patent: May 9, 1989

[54] HYDROGEN PRODUCTION AND CATALYST DEMETALLIZATION PROCESS

[75] Inventor: Frank J. Elvin, Kenner, La.

[73] Assignee: Chemcat Corporation, Kenner, La.

[21] Appl. No.: 920,611

[22] Filed: Oct. 20, 1986

[51] Int. Cl.$^4$ .................... C10G 15/00; C01B 17/02
[52] U.S. Cl. ................... 208/251 H; 208/52 CT; 208/58; 208/106; 423/658.2; 502/516
[58] Field of Search ............ 208/52 CT, 25 H, 106, 208/58; 423/573 G; 502/516

[56] References Cited

U.S. PATENT DOCUMENTS

| | | | |
|---|---|---|---|
| 2,971,824 | 2/1961 | Johnson et al. | 423/573 G |
| 2,979,384 | 4/1961 | Weiner et al. | 423/573 G |
| 2,984,548 | 5/1961 | Massey | 423/648 R |
| 3,122,510 | 2/1964 | Burk, Jr. et al. | 502/510 |
| 3,150,074 | 9/1964 | Smith et al. | 502/516 |
| 3,151,059 | 9/1964 | Foster et al. | 502/516 |
| 3,168,481 | 2/1965 | Erickson | 502/516 |
| 3,168,482 | 2/1965 | Anderson et al. | 502/516 |
| 3,173,882 | 3/1965 | Anderson | 502/516 |
| 3,180,706 | 4/1965 | Erickson | 502/516 |
| 3,962,409 | 6/1976 | Koetera et al. | 423/571 |
| 4,238,463 | 12/1980 | McKsic | 423/573 G |
| 4,244,810 | 1/1981 | Youngblood et al. | 423/573 G |
| 4,272,400 | 6/1981 | Silbernagel et al. | 502/516 |
| 4,302,434 | 11/1981 | Hellmer et al. | 208/52 CT |
| 4,311,683 | 1/1982 | Hass et al. | 423/573 G |
| 4,439,412 | 3/1984 | Behie et al. | 423/573 G |
| 4,461,755 | 7/1984 | Daley et al. | 423/573 G |
| 4,576,814 | 3/1986 | Hass et al. | 423/573 G |
| 4,605,546 | 8/1986 | Voirin | 423/573 G |

FOREIGN PATENT DOCUMENTS

| | | | |
|---|---|---|---|
| 1729167 | 3/1966 | Canada | 208/52 CT |
| 1134596 | 11/1982 | Canada | 423/573 G |
| 1283497 | 3/1961 | France | 423/648 R |

Primary Examiner—W. J. Shine
Assistant Examiner—Helane Myers
Attorney, Agent, or Firm—Frank J. Uxa, Jr.

[57] ABSTRACT

A process for the production of molecular hydrogen and demetallization of solid particles comprising:

(a) contacting hydrogen sulfide at conditions effective to convert at least a portion of the hydrogen sulfide into molecular hydrogen, the contacting being conducted in the presence of solid particles comprising at least one metallic component effective to promote hydrogen sulfide conversion;

(b) separating the molecular hydrogen from elemental sulfur formed in step (a) and unconverted hydrogen sulfide and recovering a product enriched in molecular hydrogen; and (c) demetallizing at least a portion of the solid particles from step (a) to produce demetallized solid particles having a reduced content of the metallic component.

19 Claims, No Drawings

HYDROGEN PRODUCTION AND CATALYST DEMETALLIZATION PROCESS

This invention relates to a process for the production of molecular hydrogen, i.e., $H_2$, and the demetallization of solid particles. More particularly, the invention relates to a process for the production of molecular hydrogen which involves hydrogen sulfide conversion using solid particles including metallic component effective to promote such hydrogen sulfide conversion, and for the demetallization of such solid particles.

Hydrogen is a valuable material in many of the process industries. For example, in hydrocarbon processing, molecular hydrogen is used in many hydrocarbon conversion processes, e.g., hydrocracking, reforming, hydrodenitrogenation, hydrodesulfurization, and other hydro-conversion processes. The need for additional quantities of molecular hydrogen, produced in a cost-effective manner, is very apparent.

Hydrogen sulfide is often a by-product from hydrocarbon conversion processing. This hydrogen sulfide can be subjected to Claus processing to recover elemental sulfur. However, it would be advantageous to provide a more effective process for producing molecular hydrogen, and preferably elemental sulfur as well, from hydrogen sulfide.

The following U.S. patents are included among those reviewed during the preparation of this application: U.S. Pat. Nos. 4,552,747; 4,374,819; 4,219,537; 4,207,292; 4,147,762; 4,066,738; 4,041,141; 3,615,219; and Re. 19,531.

Catalytically promoted processes for the chemical conversion of hydrocarbons include cracking, hydrocracking, reforming, hydrodenitrogenation, hydrodesulfurization, etc. Such reactions generally are performed at elevated temperatures, for example, about 300 degrees F. to 1200 degrees F., more often about 600 degrees F. to about 1000 degrees F. Feedstocks to these processes comprise normally liquid and solid hydrocarbons which, at the temperature of the conversion reaction, are generally in the fluid, i.e., liquid or vapor, state and the products of the conversion usually are more valuable, e.g., lower boiling, materials.

Typical crudes which are contaminated with metals and some average amounts of metal are: North slope, 11 ppm nickel, 33 ppm vanadium; Lagomedio (Venezuelan), 12 ppm nickel, 116 vanadium; light Iranian, 16 ppm nickel, 44 ppm vanadium; heavy Iranian, 30 ppm nickel, 22 ppm vanadium. In general, a crude oil can contain from about 5 to 500 ppm nickel and from about 5 to 1500 ppm vanadium. Moreover, since the metals tend to remain behind during processing, the bottoms of typical feeds will have an amount of metals two, three, four times or more than the original crude. For example, reduced crude or residual stocks can have vanadium levels as high as 1000-2000 ppm. Typical residual stocks and their vanadium level include: Sag River atmospheric residuum, 48 ppm vanadium; heavy Iranian atmospheric residuum, 289 ppm vanadium; Canadian tar sand bitumen, 299 ppm vanadium; Tia Juana Vacuum residuum, 570 ppm vanadium; and Orinoco Heavy Crude, 1200 ppm vanadium. The higher the metal level in the feed, the more quickly a given catalyst will be poisoned and consequently the more often or more effective the demetallization of that catalyst must be.

Of the various metals which are to be found in representative hydrocarbon feedstocks some, like the alkali metals, only deactivate the catalyst without changing the product distribution; therefore, they might be considered true poisons. Others such as iron, nickel, vanadium and copper markedly alter the selectivity and activity of cracking reactions if allowed to accumulate on the catalyst and, since they affect process performance, are also referred to as "poisons". A poisoned catalyst with these metals generally produces a higher yield of coke and hydrogen at the expense of desired products, such as gasoline, fuel oils and butanes. For instance, U.S. Pat. No. 3,147,228 reports that it has been shown that the yield of butanes, butylenes and gasoline, based on converting 60 volume percent of cracking feed to lighter materials and coke dropped from 58.5 to 49.6 volume percent when the amount of nickel on the catalyst increased from 55 ppm to 645 ppm and the amount of vanadium increased from 145 ppm to 1480 ppm in a fluid catalytic cracking of a feedstock containing some metal contaminated stocks. Since any cracking units are limited by coke burning or gas handling facilities, increased coke or gas yields require a reduction in conversion or throughput to stay within the unit capacity.

Many patents have issued disclosing various approaches to removing metals from hydrocarbon conversion catalysts and then returning the catalyst to hydrocarbon conversion service. Certain of these patents involve chlorinating metal contaminated alumina, silica-alumina and silica catalysts at elevated temperatures. See, for example, U.S. Pat. Nos. 3,150,104; 3,122,510; 3,219,586; and 3,182,025 each of which is hereby incorporated in its entirety herein by reference. In certain instances, prior patents have taught the use of liquid aqueous compositions containing ammonium ion to remove vanadium from the oxide-based catalyst and/or to at least partially neutralize the chlorine and/or hydrogen chloride which exists with the chlorinated, oxide-based catalyst.

In the more recent past, other demetallization processes have been suggested which do not primarily involve chlorinating of the catalyst. See, for example, U.S. Pat. Nos. 4,101,444; 4,163,709; 4,163,710; 4,243,550 and related patents. These newer processes seek to effectively demetallize the newer, zeolite-containing catalysts while eliminating the use and handling of chlorinating agents and chlorinated catalyst which are often corrosive, particularly at elevated temperatures. These relatively less severe demetallization processes were also thought to be less likely to detrimentally affect the relatively fragile zeolite-containing catalysts.

In commonly assigned, pending U.S. patent application Ser. No. 881,334, a demetallization process involving chlorinating a synthetic crystalline material-containing catalyst is disclosed. This application teaches contacting the chlorinated catalyst with a liquid aqueous composition substantially free of ammonium ions to provide a demetallized catalyst with improved catalytic activity. This application is hereby incorporated in its entirety herein by reference. Certain of the above-noted patents and applications teach subjecting metal contaminated catalysts to one or more reductive/oxidative washes to improve catalyst performance. In particular, see U.S. Pat. No. 4,101,444 which is hereby incorporated in its entirety herein by reference.

In spite of the substantial amount of past work, there still remains a need for a still further improved process to advantageously affect at least one of the catalytic properties of metal contaminated, hydrocarbon conversion catalysts.

Therefore, one object of the present invention is to provide a process for the production of molecular hydrogen.

Another object of the invention is to provide a process for the production of molecular hydrogen from hydrogen sulfide.

A further object of the invention is to provide a process for demetallizing solid particles.

A still further object of the invention is to provide a process for hydrogen production using metallic component-containing solid particles and for demetallizing such solid particles.

An additional object of the invention is to provide an integrated process for molecular hydrogen production, solid particle demetallization and hydrocarbon conversion. Other objects and advantages of the present invention will become apparent hereinafter.

An improved process for the production of molecular hydrogen using solid particles containing at least one metallic component and for demetallizing such solid particles has been discovered. In one broad aspect, the process comprises: (a) contacting hydrogen sulfide at conditions effective to convert, preferably to reduce, at least a portion of the hydrogen sulfide into molecular hydrogen, the contacting being conducted in the presence of solid particles comprising at least one metallic component effective to promote the hydrogen sulfide conversion; (b) separating the molecular hydrogen from elemental sulfur formed in step (a) and unconverted hydrogen sulfide and recovering a product enriched in molecular hydrogen; and (c) demetallizing at least a portion of the solid particles from step (a) to produce demetallized solid particles having a reduced content of the metallic component.

The present process provides substantial advantages. For example, hydrogen sulfide, which is often an unwanted processing by-product, is converted substantially directly into useful and valuable molecular hydrogen. By selectively choosing, as will be discussed hereinafter, the solid particles for step (a), additional cost and processing economies are achieved. Surprisingly, demetallizing the solid particles after hydrogen sulfide contacting provides demetallized solid particles which often have improved effectiveness, e.g., as catalysts in hydrocarbon conversion service. In addition, if desired, a combined or integrated hydrogen production/solid particle demetallization/hydrocarbon conversion process can be employed which provides further substantial economic and processing advantages.

The composition of the presently useful solid particles may vary widely provided that such solid particles are capable of promoting the conversion, preferably reduction, of hydrogen sulfide to molecular hydrogen, and preferably elemental sulfur. Such solid particles include at least one metal, i.e., metallic component, effective to promote the conversion of hydrogen sulfide to molecular hydrogen in the hydrogen sulfide contacting step of the present process. For example, such metallic components can be selected from Group IV b of the Periodic Table, in particular molybdenum and tungsten; Group VIII of the Periodic Table, in particular nickel, iron, and cobalt; vanadium; copper; the rare earth metals, in particular cerium and lanthanum; yttrium and the like and mixtures thereof. By "effective to promote the conversion of hydrogen sulfide" is meant that the metallic component or components are capable of acting as a pure catalyst (remaining substantially uninvolved in any chemical reaction with hydrogen sulfide) for the hydrogen sulfide conversion and/or are capable of combining with the sulfur portion of the hydrogen sulfide molecule.

The amount of metallic components present on the solid particles may vary over a wide range. For example, the amount of metallic component may be in the range of about 1 ppm by weight or less to about 30% by weight or more, calculated as elemental metal, of the presently useful solid particles. Preferably, the total amount of metallic components capable of promoting the conversion of hydrogen sulfide in the present invention is in the range of about 100 ppm. by weight to about 20% by weight of the solid particles.

One particularly useful class of solid particles include solid particles which have previously been used to promote hydrocarbon conversion, more preferably to promote catalytic hydrocarbon cracking, of a substantially hydrocarbon feedstock, e.g., in a fluid bed reaction system such as a conventional fluid-bed catalytic cracking unit (FCCU).

The composition of the previously used solid particles useful in the present invention may vary widely, provided that such solid particles are capable of promoting the desired hydrogen sulfide conversion, the particular chemical make-up chosen being dependent, for example, on the type of hydrocarbon chemical conversion service in which the solid particles previously have been used. Thus, the solid particles suitable for use in the present invention often comprise at least one of the natural or synthetic materials which are capable of promoting the hydrocarbon conversion which such solid particles were previously used to promote. For example, when the desired hydrocarbon conversion involves one or more of hydrocarbon cracking (preferably in the substantial absence of added free molecular hydrogen), disproportionation, isomerization, hydrocracking, reforming, dehydrocyclization, polymerization, alkylation and dealkylation, such suitable materials include acid-treated natural clays, such as montmorillonite, kaolin and bentonite clays; natural or synthetic amorphous materials, such as alumina, silica-alumina, silica-magnesia and silica-zirconia composites; and crystalline materials.

The solid particles useful in the present invention preferably comprise at least one synthetic crystalline material in an amount effective to promote the above-noted hydrocarbon conversion at hydrocarbon conversion conditions. Materials known as zeolites or molecular sieves are one preferred class of synthetic crystalline materials. Useful zeolites include not only synthetic zeolites, but also naturally occurring zeolites the chemical make-up of which is modified or changed to enhance one or more of the catalytic properties of the naturally occurring zeolites. In one embodiment the solid particles preferably comprise one or more synthetic crystalline materials, such as aluminosilicates, SAPO, TAPO, MeAPO, AlPO, ZSM-series, LZ-Z10, LZ-10, USY and the like. Certain of these synthetic crystalline materials are discussed in U.S. Pat. Nos. 4,310,440; 4,440,871; 4,500,651; and 4,503,023.

Compositions of the solid particles which are particularly useful in the present invention are those in which the synthetic crystalline materials are incorporated in amounts effective to promote the above-noted previous hydrocarbon conversion, e.g., a catalytically effective amount, into a porous matrix which comprises, for example, amorphous material which may or may not be itself capable of promoting such hydrocarbon conversion. Included among such matrix materials are clays and amorphous compositions of alumina, silica, silica-alumina, magnesia, zirconia, mixtures of these and the like. The synthetic crystalline material is preferably incorporated into the matrix material in amounts within the range of about 1% to about 75%, more preferably about 2% to about 50%, by weight of the total solid particles. The preparation of crystallineamorphous matrix catalytic materials is described in U.S. Pat. Nos. 3,140,253 and Re. 27,639.

The solid particles previously used in the catalytic hydrocarbon cracking embodiment of the present invention may be any conventional catalyst capable of promoting hydrocarbon cracking at the conditions present in the hydrocarbon cracking reaction zone, i.e., hydrocarbon cracking conditions, and preferably, containing at least one of the above-noted synthetic crystalline materials. The hydrocarbon cracking catalytic activity of such solid particles is restored at oxidative conditions, e.g., such as those conditions present in a conventional cracking unit regeneration zone. Typical among these conventional catalysts are those which comprise alumina, silica and/or silica-alumina, and preferably at least one synthetic crystalline material, e.g., aluminosilicate, having pore diameters of about 8 Angstroms to about 15 Angstroms and mixtures thereof. When the solid particles to be used in the hydrocarbon cracking embodiment of the present invention contain crystalline aluminosilicate, the crystalline aluminosilicate may, prior to the treating of the present invention, include minor amounts of conventional metal promoters such as the rare earth metals, in particular cerium.

Although this invention is useful in combination with many hydrocarbon conversions, it finds particular applicability in combination with systems for the catalytic cracking of hydrocarbons where oxidative regeneration of catalyst particles is employed. Such catalytic hydrocarbon cracking often involves converting, i.e., cracking, heavier or higher boiling components, to gasoline and other lower boiling components, such as hexane, hexene, pentane, pentene, butane, butylene, propane, propylene, ethane, ethylene, methane and mixtures thereof. Often, the substantially hydrocarbon feedstock comprises a gas oil fraction, e.g., derived from petroleum, shale oil, tar sand oil, coal and the like. Such feedstock may comprise a mixture of straight run, e.g., virgin, gas oil. Such gas oil fractions often boil primarily in the range of about 400° F. to about 1000° F. Other substantially hydrocarbon feedstocks, e.g., naphtha, high boiling or heavy fractions of petroleum, petroleum residuum, shale oil, tar sand oil, coal and the like, may be cracked using the solid particles useful in the prevent invention. Such substantially hydrocarbon feedstock often contains minor amounts of other elements, e.g., nickel, iron, vanadium, copper, sulfur, nitrogen, oxygen and the like.

Hydrocarbon cracking conditions are well known and often include temperatures in the range of about 850° F. to about 1100° F., preferably about 900° F. to about 1050° F. Other reaction conditions usually include pressures of up to about 100 psia.; catalyst to oil ratios of about 1 to 2 to about 25 to 1, preferably about 3 to 1 to about 15 to 1; and weight hourly space velocities (WHSV) of about 3 to about 60. These hydrocarbon cracking conditions may be varied depending, for example, on the feedstock and catalyst being used, and the product or products wanted.

In addition, the catalytic hydrocarbon cracking system includes a regeneration zone for restoring the hydrocarbon cracking catalytic activity of the solid particles previously used to promote hydrocarbon cracking. Carbonaceous deposit-containing solid particles from the reaction zone are typically contacted with free oxygen-containing gas in the regeneration zone at conditions to restore or maintain the cracking activity of the solid particles by removing, i.e., combusting, at least a portion of the carbonaceous material from the solid particles. The conditions at which such free oxygen-containing gas contacting takes place may vary, for example, over conventional ranges. The temperature in the catalyst regeneration zone of a hydrocarbon cracking system is often in the range of about 900° F. to about 1500° F., preferably about 1100° F. to about 1400° F. Other conditions within such regeneration zone may include, for example, pressures up to about 100 psia., and average catalyst contact or residence times within the range of about 3 minutes to about 75 minutes. Sufficient oxygen is preferably present in the regeneration zone to completely combust the carbon and hydrogen of the carbonaceous deposit material, for example, to carbon dioxide and water. The amount of carbonaceous material deposited on the solid particles in the reaction zone is preferably in the range of about 0.005% to about 15%, more preferably about 0.1% to about 5% by weight of the solid particles.

The previously used solid particles include one or more metallic components effective to promote the above-noted hydrogen sulfide conversion. Such metallic components may be present on the solid particles to improve one or more properties of the solid particles as they are used in the previous hydrocarbon conversion, or as a result of contamination from metal or metals contained in the substantially hydrocarbon feedstock. Metallic components resulting from this contamination are often included in solid particles which have previously been used for catalytic hydrocarbon cracking of metal-containing substantially hydrocarbon feedstocks. Of course, such cracking catalysts may include one or more metallic components which are useful in both hydrocarbon cracking service and to promote the hydrogen sulfide conversion of the present invention. The rare earth metals, and in particular cerium, lanthanum and mixtures thereof, are examples of such dual-functional metallic components.

The size of the solid particles useful in the present invention may vary over a wide range, depending, for example, on the type of solid particle bed configuration, e.g., fixed-bed, ebullating-bed, fluidized-bed and the like, being employed. The solid particles are preferably sized to be suitable for use in a fluidized bed. Preferably, the solid particles have diameters in the range of about 10 microns to about 250 microns, more preferably in the range of about 20 microns to about 125 microns. In the event such solid particles have previously been used to promote hydrocarbon catalytic cracking in an FCCU, then such particles are preferably sized in accordance with the requirements of the FCCU.

The hydrogen sulfide contacting step of the present process is conducted so as to convert at least a portion of the $H_2S$ contacted in this step into molecular hydrogen, and preferably elemental sulfur. The hydrogen sulfide contacting step is often conducted at elevated temperatures, preferably in the range of about 500° F. to about 1700° F.; more preferably about 800° F. to about 1400° F.; and still more preferably about 900° F. to about 1350° F. Contacting pressures are not narrowly critical in the present invention and preferably are in the range of about 0.05 atmospheres to about 30 atmospheres; more preferably about 0.2 atmospheres to about 25 atmospheres; and still more preferably about 1 atmosphere to about 20 atmospheres. The weight hourly space velocity (WHSV) of hydrogen sulfide in this contacting step is also not narrowly critical and may be in the range of about 0.1 or less to about 100 or more. Because of economic considerations, it is preferred that at least about 1%, more preferably at least about 3%, of the combined hydrogen in the hydrogen sulfide contacted in this step is converted, per pass, to molecular hydrogen. Thus, the WHSV is preferably set to meet these conversion criteria.

The hydrogen sulfide contacted in the present invention can be provided to the hydrogen sulfide contacting step as an admixture with other components which do not substantially interfere with the functioning of this contacting step. Such other components include hydrogen, nitrogen, carbon monoxide, carbon dioxide, $CS_2$, mercaptans and the like. However, it is preferred that the hydrogen sulfide-containing material provided to this contacting comprise a major amount by volume, i.e., at least about 50% by volume, more preferably at least about 70% and still more preferably at least about 90%, by volume of hydrogen sulfide.

The solid particles used to convert hydrogen sulfide in the present invention can be treated periodically to improve or restore the ability of such particles to promote the desired hydrogen sulfide conversion. Such treatment preferably involves reducing the sulfur content of the solid particles. For example, such treatment may involve oxidation of the sulfur-containing compounds on the solid particles, or contacting the solid particles with a reducing medium, e.g., hydrocarbons, carbon monoxide, hydrogen and the like. The length of time between such treatments may vary widely depending, for example, on the specific solid particles being used, the specific hydrogen sulfide-containing material being contacted, the specific contacting conditions, and the desired degree of hydrogen sulfide conversion. In one embodiment, a slip stream of solid particles is substantially continuously removed from the contacting, treated to at least restore a portion of the hydrogen sulfide conversion promotion activity of the solid particles, and returned to the contacting. The average residence time of the solid particles in the hydrogen sulfide contacting in this embodiment may run up to about 20 hours or more.

The elevated temperatures at which the hydrogen sulfide contacting step preferably occurs may require that the hydrogen sulfide-containing material be heated prior to being subjected to such contacting. However, in one embodiment, this contacting is integrated with a catalyst hydrocarbon cracking unit, e.g., an FCCU. In this embodiment, hot regenerated cracking catalyst, from the catalyst regeneration zone of the cracking unit is fed substantially continuously to the contacting step. This regenerated catalyst, which acts as the solid particles in the hydrogen sulfide contacting step, provides a substantial amount of the heat required in this step. Preferably, the heat included in this regenerated catalyst is sufficient such that little or no separate heating of the hydrogen sulfide-containing material is required prior to the hydrogen sulfide contacting step. In this embodiment, the hydrogen sulfide-containing material is preferably provided to this contacting at a temperature below the average temperature of such contacting.

Preferably, the cracking catalyst is substantially continuously withdrawn from the hydrogen sulfide contacting step and replaced by more hot regenerated cracking catalyst. The cracking catalyst from the hydrogen sulfide contacting step is preferably demetallized and returned to the reaction zone of the catalytic hydrocarbon cracking unit. The average catalyst residence time of the solid particles in the hydrogen sulfide contacting step of this embodiment is in the range of about 0.25 hours to about 20 hours, more preferably about 0.5 hours to about 5 hours. Such average residence time is set to maintain a suitable heat balance. In addition, such preferred and more preferred average residence times have been found to provide satisfactory hydrogen sulfide conversion to molecular hydrogen.

The separation step, e.g., step (b), of the present process involves separating molecular hydrogen from elemental sulfur, and unconverted hydrogen sulfide and recovering a product enriched in molecular hydrogen. Preferably, this separation step comprises condensing elemental sulfur from a first mixture comprising molecular hydrogen, elemental sulfur and hydrogen sulfide; and extracting hydrogen sulfide from a second mixture comprising molecular hydrogen and hydrogen sulfide. The preferred sulfur condensing step often involves cooling the first mixture, e.g., hydrogen sulfide, sulfur and hydrogen-containing effluent from the hydrogen sulfide contacting step. Such cooling should be sufficient to separate at least a portion, preferably a major portion and more preferably at least about 95%, of the sulfur in the first mixture as liquid (molten) or solid sulfur. A conventional water cooled condenser may be employed.

The second mixture, e.g., the first mixture minus the removed or separated elemental sulfur, is preferably provided to an extraction operation to provide a relatively pure molecular hydrogen product. Many different solvent systems have been suggested in the prior art and may be used here to extract hydrogen sulfide from molecular hydrogen. One of the most useful extraction solvents comprises an amine-containing solvent. Such amine-containing solvent systems are conventionally used, e.g., in petroleum refineries, to remove hydrogen sulfide from molecular hydrogen. The amines preferably used are selected from substantially hydrocarbon amines containing one to about 10 carbon atoms per molecule. The use of a solvent comprising diethylene amine provides good results in the process of the present invention.

The second mixture is preferably contacted with "lean" extraction solvent in a countercurrent extractor system. Co-current extractor systems can also be employed. The solvent acts to extract hydrogen sulfide from the second mixture, thus, preferably providing a molecular hydrogen enriched product comprising at least about 80%, more preferably at least about 90% and still more preferably at least about 99% (substantially pure), by volume of molecular hydrogen. This enriched molecular hydrogen product is preferably substantially free of hydrogen sulfide. The extraction solvent, now "rich" in hydrogen sulfide is fed to an extraction stripper, e.g., a fractionation tower, where the extraction solvent is separated from the extracted hydrogen sulfide. The more "lean" solvent is returned to the extractor system, while the hydrogen sulfide from the stripper is preferably recycled to the hydrogen sulfide contacting step for conversion to molecular hydrogen, and preferably elemental sulfur.

The sulfur condenser, extractor system and extraction stripper operating conditions may vary widely and are not narrowly critical to the present invention. Such conditions may vary depending, for example, on the compositions of the first and second mixtures, the temperature of the cooling water available, and on the specific chemical make-up of the extraction solvent being used. The specific operating conditions are preferably chosen to achieve cost, operating and processing effectiveness on an individual case-by-case basis.

Other conventional techniques can be employed to separate the molecular hydrogen from the unconverted hydrogen sulfide. For example, pressure swing absorption and semipermeable membranes can be used.

The present hydrogen sulfide contacting step results in at least a portion of the metallic component or components present in the solid particles being converted to metal-sulfur containing compound or compounds. These metal-sulfur compounds are often more easily removed from the solid particles relative to the original metallic component. Thus, the present hydrogen sulfide conversion step not only produces molecular hydrogen, but also at least partially activates the metallic component or components on the solid particles leading to demetallization of the solid particles, e.g., after the present hydrogen sulfide conversion step.

This demetallization may involve washing the solid particles from the hydrogen sulfide conversion step and/or subjecting these solid particles to chlorination/oxidation followed by washing. In fact, any suitable demetallization scheme may be employed on the solid particles containing metal-sulfur containing compound or compounds. Such demetallization provides solid particles with increased effectiveness or activity (relative to the original metal-containing or undemetallized solid particles) to promote the desired, previous hydrocarbon conversion. Certain of these demetallization processes are more fully described in commonly assigned U.S. patent application Ser. Nos. 881,334 filed July 21, 1986, and 895,130 filed Aug. 11, 1986, each of which is hereby incorporated in its entirety by reference herein.

Among the preferred processing schemes to demetalize the present solid particles containing metal-sulfur compound or compounds are the following:

Exposure of the solid particles to oxidation temperature, preferably in the range of about 525° F. to 725° F. converts at least a portion of the sulfur-containing metal compounds on the solid particles to a form dispersible or removable by a subsequent washing step. Oxidation can be performed by either a gaseous or liquid phase oxidation to provide at least a portion of the metallic components, e.g., nickel, vanadium and iron, in a more readily removable, dispersible form. For example, the sulfur-containing metal compounds may be converted to the simple monosulfide or oxygenated sulfur salts. As used herein, "dispersible" is intended to include minute particle size material, as well as soluble and colloidal size particles.

The demetallization may make use of chlorination, preferably vapor phase chlorination, at moderately elevated temperatures up to about 700° F. or even up to about 900° F. or 1000° F., wherein the composition and structure of the solid particles are not materially harmed by the treatment and a substantial amount, preferably at least about 30% and more preferably at least about 50%, of the metallic component content of the solid particles is converted to chlorides. Such catalyst chlorination procedures are more fully described in U.S. Pat. Nos. 3,150,104; 3,122,510; 3,219,586; and 3,182,025 and commonly assigned U.S. patent application Ser. No. 881,334, filed July 21, 1986, each of which is hereby incorporated in its entirety by reference herein.

After converting at least a portion of the metallic component or components on the solid particles to a water soluble or dispersible form, the solid particles are preferably contacted or washed in a liquid aqueous composition to remove at least a portion of the metallic component or components.

The water is sometimes distilled or deionized prior to contact with the solid particles. However, the aqueous medium can contain extraneous ingredients in trace amounts, so long as the medium is aqueous-based and the extraneous ingredients do not interfere with demetallization or adversely affect the properties of the solid particles. Temperatures of about 150° F. to the boiling point of water are helpful in increasing the solubility of the metal compounds, e.g., chlorides. Temperatures above 212° F. and elevated pressures may be used but the results do not seem to justify the added equipment.

The initial liquid aqueous composition may be a reductive wash medium, which is preferably followed by an oxidative wash. These washes may be given alternately or several reductive washes may be followed by several oxidative washes. When alternating washes are used, the final wash is preferably an oxidative wash. As used herein, "reductive" wash refers to a wash with an aqueous solution containing a reducing agent or an agent which may accept electrons. Similarly, "oxidative" wash refers to a wash with an aqueous solution containing an oxidizing agent or an agent which may accept elections. Moreover, "wash" refers to a treatment with the solution which may be accomplished by contacting the solid particles with the wash solution for a time sufficient to cause an interaction between the solution and solid particles thereby removing at least a portion of the metallic component or components. The contacting may be a batch operation, a semi-continuous operation or a continuous operation. Thus, a "wash" may include merely stirring in a batch vessel or a complex series of counter current contactors or continuous contactors. The reductive washes and oxidative washes useful in the present invention are more fully described in U.S. Pat. No. 4,101,444 and in commonly assigned, U.S. patent application Ser. No. 881,334.

After the solid particles are washed, the solid particles slurry can be filtered to give a cake. The cake may be reslurried one or more times with water or rinsed in other ways, such as, for example, by a water wash of the filter cake.

If desired, additional metals removal may be obtained by repeating the demetallization step or using one or more other, e.g., known, demetallization steps. Inert gases frequently may be employed after contact with reactive vapors to remove any of these vapors entrained in the solid particles or to purge the solid particles of reaction products.

After the washing and rinsing treatment which may be used in the preferred solid particles demetallization procedure, the solid particles may be treated with at least one rare earth metal and/or at least one ammonium-ion containing component to improve the hydrocarbon conversion properties of such solid particles, e.g., in accordance with the procedures disclosed in commonly assigned U.S. patent application Ser. No. 895,130. After such demetallization, and optionally rare earth metal-/ammonium ion treatment, the solid particles are transferred to a hydrocarbon conversion system, for instance, to a catalyst reactor or regenerator. The solid particles may be returned as a slurry, or it may be desirable first to dry the solid particles, for example, at a temperature in the range of about 215° F. to about 320° F. Also, prior to using the demetallized solid particles in the hydrocarbon conversion operation they can be calcined, for example, at temperatures preferably in the range of about 700° F. to about 1300° F. Preferably, the demetallized solid particles are not calcined at a temperature higher than the temperature present during catalyst regeneration, e.g., in the catalyst regeneration zone, prior to using the demetallized solid particles in the hydrocarbon conversion operation. Such high temperature calcination has been found to reduce the catalytic effectiveness of the solid particles. The demetallized solid particles may be slurried with hydrocarbons and added to the reactor vessel, if desired.

The amount of metallic component or components removed or the proportion of each metallic component removed in practicing the present demetallization procedures may be varied by proper choice of treating conditions. It may prove necessary to repeat the treatment to reduce the metals to an acceptable level, perhaps with variations when one metal is greatly in excess. Preferably, the above-noted demetallization step or steps will provide greater than about 50 weight % reduction in nickel, about 50 weight % reduction in vanadium and about 30 weight % reduction in iron. Such processing preferably provides about 70-90 weight % reduction in nickel, about 50-80 weight % reduction in vanadium and about 30-75 weight % reduction in iron when the solid particles initially contain as much as about 0.1 to 0.5 weight % nickel, about 0.3 to 1.0 weight % vanadium and about 0.2 to 1.2 weight % of iron.

The following non-limiting examples illustrate certain aspects of the present invention.

EXAMPLES 1 to 3

A mass of commercial equibrium fluid catalytic cracking catalyst was obtained for testing. This catalyst was commercially manufactured and contained a catalytically effective (to promote hydrocarbon cracking) amount of USY synthetic zeolite. The catalyst had been used in a commercial fluid bed catalytic cracking operation and included amounts of alkali metal, vanadium (about 1000-3000 ppm. by weight), iron (about 5000 ppm. by weight), and nickel (about 1500 ppm. by weight) from the catalytic cracking hydrocarbon feedstock which became associated with the catalyst when the catalyst was in the cracking reaction zone. The catalyst used in the testing was substantially carbon free.

A two inch i.d. by eighteen inch long quartz vessel fitted with a coarse quartz frit was used as a reactor vessel. One inch i.d. by ten inch long extensions were positioned at either end of this reactor vessel and terminated in ball joints which allowed quick disconnecting of the entire assembly. Heat to the fluid bed reactor vessel was supplied by a Lindberg Model 54442-D furnace. Heat tracing of entry and exit gases was effected by external heat tape wrapping.

The catalyst was charged to this reactor vessel and fluidized with compressed air while heating to 1350° F. Approximately two hours were needed for heating to operating temperature, including a fifteen minute period when the gas lines and the fluid bed were flushed with nitrogen before introducing hydrogen sulfide.

After this nitrogen flush, the catalyst bed was fluidized with 100% hydrogen sulfide for four hours. The amount of hydrogen sulfide was chosen so as to maintain substantially uniform fluidization of the catalyst bed. Spot samples of the gaseous effluent from the reactor vessel taken during this hydrogen sulfide contacting indicated that this effluent contained about 4.5 to about 7.5% by volume of molecular hydrogen. There also was evidence of elemental sulfur in this effluent.

Following this hydrogen sulfide contacting step, the reactor vessel and contents were cooled to 650° F. under nitrogen fluidization. The catalyst bed was then fluidized with 100% chlorine gas for 90 minutes at 650° F. Following the chlorination, the reactor was flushed with nitrogen for fifteen minutes while maintaining a temperature of about 650° F. This nitrogen purge removed some chlorine from the void space in the catalyst bed and some volatile vanadium, and iron chlorine-containing components.

One portion of the hot chlorinated catalyst was cooled to ambient temperature, i.e., about 70° F., and contacted with a liquid water wash. The catalyst/water slurry was filtered on a Buchner funnel, and oven dried at 230° F. overnight. This dried catalyst is designated Sample 2.

Another portion of the hot chlorinated catalyst was cooled to ambient temperature and contacted with a liquid water wash. The catalyst/water slurry was filtered on a Buchner funnel, reslurried again in water and refiltered on a Buchner funnel and oven dried at 230° F. overnight. This dried catalyst is designated Sample 3.

The original, untreated catalyst (Sample 1) and Samples 2 and 3 were each tested for catalytic hydrocarbon cracking activity using the Micro Activity Test (ASTM D 3907-80). Results of these tests are shown in Table 1.

TABLE 1

| Sample | MAT No. | Gasoline wt. % | Coke Factor | Gas Factor |
|---|---|---|---|---|
| 1 | 65.2 | 46.8 | 3.0 | 1.1 |
| 2 | 67.6 | 47.2 | 2.4 | 1.2 |
| 3 | 66.3 | 46.4 | 2.6 | 1.2 |

Each of Samples 2 and 3 had reduced contents of vanadium, iron and nickel relative to the original untreated catalyst.

EXAMPLE 4

A commercial fluid bed catalyst cracking (FCCU) processes a metals containing, substantially hydrocarbon gas oil feedstock to gasoline and other lower boiling, more valuable products. During the course of this operation, the catalyst picks up metals from the feedstock. The equilibrium catalyst from this unit has a chemical composition and metals content substantially similar to the catalyst tested in Example 1.

This unit processes 50,000 barrels per day of this metal-containing feedstock. Reaction temperature averages 900° F. and catalyst leaving the catalyst regenerator is at an average temperature of 1300° F. About 20 tons per minute of equilibrium catalyst is circulated from the regeneration zone to the reaction zone of the FCCU.

A stream of substantially pure hydrogen sulfide is available at ambient temperature and 40 psig pressure.

A reaction vessel suitable to hold 3360 pounds of the equilibrium catalyst noted above as a fluidized bed is situated so that a small stream (14 lbs. per minute) of equilibrium catalyst from the regeneration zone of the FCCU flows into this reaction vessel. The average residence time of the catalyst in the reaction vessel is four (4) hours.

100% hydrogen sulfide is introduced into the reaction vessel in sufficient quantity to fluidize the bed of equilibrium cracking catalyst in the reaction vessel. The gaseous effluent from the reaction vessel is cooled to a temperature at which substantially all of the elemental sulfur in this gaseous effluent is liquified and separated. The remainder of the effluent contains about 95% by volume of hydrogen sulfide and about 5% by volume of molecular hydrogen. This hydrogen sulfide/molecular hydrogen material is introduced into a conventional countercurrent contactor. A conventional diethylene amine-based solvent system acts to extract substantially all of the hydrogen sulfide from the hydrogen sulfide/molecular hydrogen material. The gaseous material recovered from the contactor is substantially pure molecular hydrogen and is available for use as a valuable product.

The hydrogen sulfide-ladened solvent system leaves the contactor and is introduced into a distillation tower to strip the hydrogen sulfide from the solvent system. The solvent system leaving the tower is recycled back to the contactor, while the hydrogen sulfide leaving the tower is recycled back to the reaction vessel.

The equilibrium catalyst from the reaction vessel includes a certain amount of sulfur, e.g., combined with the metallic components on the catalyst to form metal, sulfur-containing compounds, and is cooled to 650° F. and passed to a chlorination zone at a rate so that substantially the same amount of catalyst is continuously present in both the reaction vessel and the chlorination zone. The catalyst is fluidized with 100% chlorine gas in the chlorination zone. The average residence time of the catalyst in the chlorination zone is 90 minutes. The chlorinated catalyst exiting the chlorination zone is cooled to ambient temperature and contacted with a liquid water wash. The catalyst/water slurry is filtered, reslurried again in water and refiltered.

The catalyst is then reslurried with water and sufficient sulfur dioxide is added to give an initial pH of about 2. The temperature is maintained at about 70° F. for about 3 minutes. The catalyst is then filtered and the aqueous sulfur dioxide wash is repeated twice more to give a total of 3 reductive washes.

The catalyst is then slurried with water and $H_2O_2$ at a rate of about 10–40 pounds/ton of catalyst is added. The initial temperature is about 175° F. and the wash is carried out for 3 minutes. The $H_2O_2$ wash is repeated once more to give a total of two oxidative washes. The catalyst is then washed with water and filtered.

The catalyst is contacted with an aqueous solution of rare earth (mainly cerium and lanthanum) salts at ambient temperature and at an initial pH of about 1–2. The amount of rare earth metal in the solution is about 10–30% by weight. The weight ratio of catalyst to solution is about 1:4–20. The contacting continued for 1 hour with agitation. The catalyst is then filtered, washed with water and refiltered.

The catalyst, which has reduced amount of vanadium, iron and nickel relative to the catalyst sent to the reaction vessel, is returned to the reaction zone of FCCU and is found to have improved activity in promoting catalytic hydrocarbon cracking. Over time, the metals level on the cracking catalyst stabilizes at a reduced level (relative to such level if the small stream of catalyst is not treated as described above) and effective catalytic hydrocarbon cracking is achieved.

The present invention provides substantial advantages and benefits. For example, valuable molecular hydrogen is effectively and efficiently produced from hydrogen sulfide, which is often a useless by-product in many industrial processes. Also, by combining hydrocarbon conversion, and in particular catalytic hydrocarbon cracking, with hydrogen sulfide conversion and catalyst demetallization, substantial additional economies are achieved. For example, the solid particles used to promote hydrocarbon conversion can also be used to convert hydrogen sulfide and be demetallized to provide effective hydrocarbon conversion. Heat generated in the hydrocarbon conversion unit can be used to reduce or even eliminate the need to heat the solid particles and hydrogen sulfide to the desired, often elevated, hydrogen sulfide conversion temperature.

While this invention has been described with respect to various specific examples and embodiments, it is to be understood that the invention is not limited thereto and that it can be practiced within the scope of the following claims.

The embodiments of the present invention in which an exclusive property or privilege is claimed are as follows:

1. A process for the production of molecular hydrogen and demetallization of solid particles comprising:
   (a) contacting hydrogen sulfide with solid particles at conditions effective to convert said hydrogen sulfide into molecular hydrogen, said solid particles comprising at least one metallic component effective to promote said hydrogen sulfide conversion;
   (b) separating said molecular hydrogen from elemental sulfur formed in step (a) and unconverted hydrogen sulfide and recovering a product enriched in molecular hydrogen; and
   (c) demetallizing at least a portion of said solid particles from step (a) to produce demetallized solid particles having a reduced content of said metallic component.

2. The process of claim 1 wherein said step (a) is conducted in the presence of a fluidized bed of said solid particles.

3. The process of claim 1 wherein said metallic component is of a metal selected from the group consisting of nickel, iron, cobalt, molybdenum, tungsten, vanadium, copper, the rare earth metals, and mixtures thereof.

4. The process of claim 1 wherein step (b) comprises condensing elemental sulfur formed in step (a) from a first mixture comprising molecular hydrogen, elemental sulfur and hydrogen sulfide; and extracting hydrogen sulfide from a second mixture comprising molecular hydrogen and hydrogen sulfide.

5. The process of claim 4 wherein said extracting utilizes an amine-containing solvent.

6. The process of claim 1 wherein at least a portion of said unconverted hydrogen sulfide is recycled to step (a).

7. The process of claim 1 wherein said solid particles utilized in step (a) have previously been used to promote the hydrocarbon cracking of a substantially hydrocarbon feedstock.

8. The process of claim 7 wherein said hydrocarbon cracking comprises catalytic hydrocarbon cracking and said substantially hydrocarbon feedstock includes at least one metallic component at least a portion of which is deposited on said solid particles during said catalytic hydrocarbon cracking.

9. The process of claim 8 wherein said metallic component is effective to promote the conversion of hydrogen sulfide to molecular hydrogen in said step (a).

10. The process of claim 9 wherein said metallic component includes a metal selected from the group consisting of nickel, iron, vanadium, copper, and mixtures thereof.

11. The process of claim 7 wherein said solid particles are passed from the catalyst regeneration zone of a hydrocarbon catalytic cracking unit to said step (a) and provide at least a portion of the heat used in step (a) to heat said hydrogen sulfide.

12. The process of claim 8 wherein said solid particles are passed from the catalyst regeneration zone of a hydrocarbon catalytic cracking unit to said step (a) and provide at least a portion of the heat used in step (a) to heat said hydrogen sulfide.

13. The process of claim 1 which further comprises utilizing at least a portion of said demetallized solid particles to promote hydrocarbon cracking.

14. The process of claim 11 which further comprises utilziing at least a portion of said demetallized solid particles to promote hydrocarbon cracking in the substantial absence of added free molecular hydrogen.

15. The process of claim 12 which further comprises utilizing at least a portion of said demetallized solid particles to promote hydrocarbon cracking in the substantial absence of added free molecular hydrogen.

16. A process for molecular hydrogen production and hydrocarbon cracking comprising:

contacting a substantially hydrocarbon feedstock at conditions effective to chemically convert at least a portion of said substantially hydrocarbon feedstock, said contacting being conducted in the presence of solid particles effective to promote said hydrocarbon cracking;

passing at least a portion of said solid particles to a separate reaction zone and contacting said passed solid particles with hydrogen sulfide at conditions effective to convert at least a portion of said hydrogen sulfide to molecular hydrogen, said solid particles including at least one metallic component effective to promote said hydrogen sulfide conditions;

demetallizing at least a portion of said solid particles from said separate reaction zone to produce demetallized solid particles having a reduced content of said metallic component; and passing said demetallized solid particles to said substantially hydrocarbon feedstock contacting step.

17. The process of claim 16 wherein said hydrocarbon cracking comprises catalytic hydrocarbon cracking and said substantially hydrocarbon feedstock includes at least one of said metallic components at least a portion of which is deposited on said solid particles during said catalytic hydrocarbon cracking.

18. The process of claim 17 wherein said substantially hydrocarbon feedstock contacting occurs in a reaction zone and said solid particles are substantially circulated between said reaction zone and a catalyst regeneration zone in which said solid particles are contacted with an oxygen-containing medium at conditions effective to restore at least a portion of said solid particles' activity to promote hydrocarbon cracking.

19. The process of claim 18 wherein said solid particles are present in said reaction zone and said separate reaction zone in the form of a fluidized bed of particles.

* * * * *